United States Patent

Kachnic et al.

[11] Patent Number: 5,928,578
[45] Date of Patent: Jul. 27, 1999

[54] SKIP-EJECT SYSTEM FOR INJECTION MOLDING MACHINES

[75] Inventors: Edward F. Kachnic, Douglasville, Ga.; James A. Walker, Boulder; Rikk Crill, Longmont, both of Colo.

[73] Assignee: Avalon Imaging, Inc., Boulder, Colo.

[21] Appl. No.: 08/824,670

[22] Filed: Mar. 26, 1997

[51] Int. Cl.⁶ .................................................. B29C 45/40
[52] U.S. Cl. ........................ 264/40.1; 264/334; 425/137; 425/139; 425/165; 425/169; 425/556; 425/444
[58] Field of Search .................... 264/40.1, 334, 264/335, 336; 425/137, 139, 153, 154, 165, 169, 554, 556, 436 R, 436 RM, 444

[56] References Cited

U.S. PATENT DOCUMENTS

| | | | |
|---|---|---|---|
| 3,303,537 | 2/1967 | Mislan | 425/137 |
| 3,642,401 | 2/1972 | Wilson | 425/137 |
| 3,937,937 | 2/1976 | McVey | 235/153 R |
| 4,143,283 | 3/1979 | Graf et al. | 307/66 |
| 4,236,181 | 11/1980 | Shibata et al. | 425/137 |
| 4,327,397 | 4/1982 | McCleery | 361/90 |
| 4,530,027 | 7/1985 | Berger | 361/92 |
| 4,603,329 | 7/1986 | Bangerter et al. | 425/137 |
| 4,818,891 | 4/1989 | Drinkwater | 307/64 |
| 4,841,364 | 6/1989 | Kosaka et al. | 425/137 |
| 4,860,150 | 8/1989 | Epstein | 361/90 |
| 5,315,161 | 5/1994 | Robinson et al. | 307/66 |
| 5,473,496 | 12/1995 | Rouy | 361/18 |
| 5,585,677 | 12/1996 | Cheon et al. | 307/64 |
| 5,599,486 | 2/1997 | Fujishiro et al. | 264/40.1 |
| 5,736,079 | 4/1998 | Kamiguchi et al. | 425/139 |

*Primary Examiner*—Jill L. Heitbrink
*Attorney, Agent, or Firm*—Chrisman, Bynum & Johnson; James R. Young

[57] ABSTRACT

A skip-eject system for an injection molding machine includes an electronic camera for acquiring an actual image of an open mold after a part ejector has operated and a controller for comparing such actual image with an ideal image of the open mold with no part in the open mold. If a comparison of the actual image with the ideal image indicates that a part is no longer in the open mold, the controller outputs a close mold signal to close the mold and start injection molding of a new part. However, if the comparison indicates that the part is still in the open mold, the controller outputs an ejection signal to actuate the ejector to cycle again. This sequence continues until a comparison of an actual image of the open mold with the ideal image indicates that the part is no longer in the open mold. In an alternative implementation, the ejector continues to cycle until a comparison of an actual image of the open mold with the ideal image indicates the part has been ejected, whereupon the controller outputs a signal to stop the ejector cycling and to close the mold for injection molding a new part. Exceeding a threshold number of ejector cycles after the mold opens signals an alarm and stops the machinery.

22 Claims, 4 Drawing Sheets

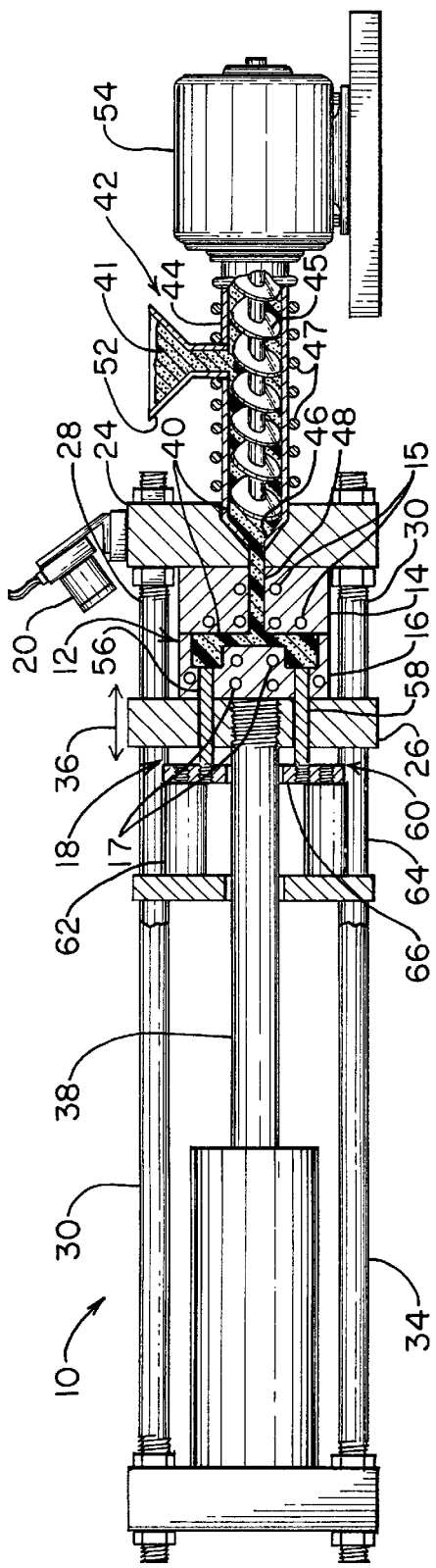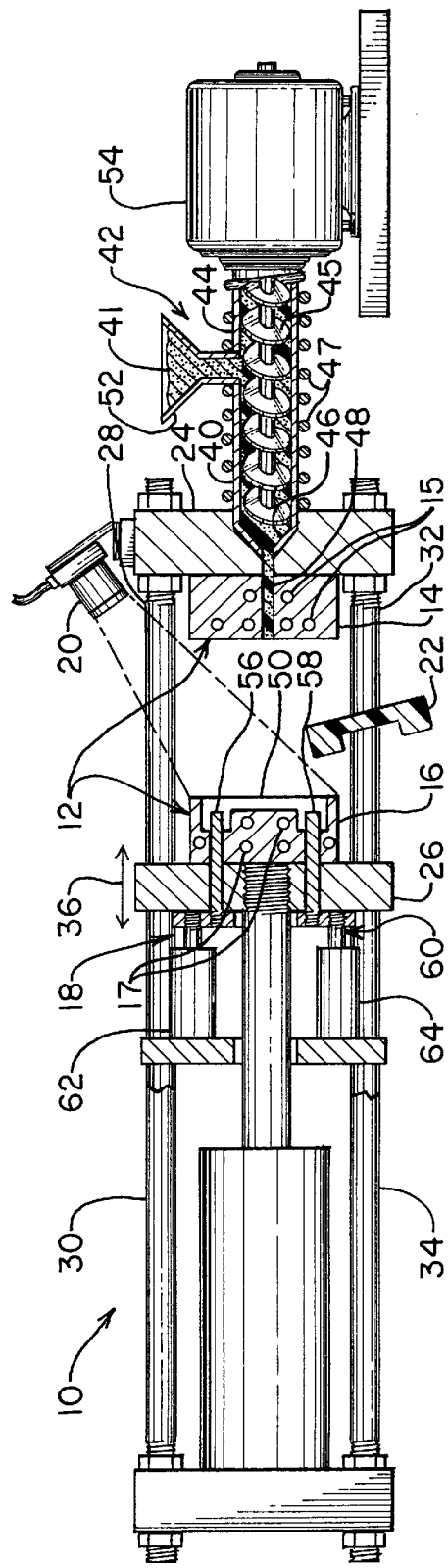

SKIP-EJECT SYSTEM FOR INJECTION MOLDING MACHINES

BACKGROUND OF THE INVENTION

1. Field of the Invention

This invention is related to injection molding apparatus controls and more specifically to a system for controlling part ejectors in injection molding apparatus.

2. State of the Prior Art

Injection molding, systems are used for molding plastic and some metal parts by forcing liquid or molten plastic materials or powdered metal in a plastic binder matrix into specially shaped cavities in molds where the plastic or plastic binder matrix is cooled and cured to make a solid part. For purposes of convenience, references herein to plastic and plastic injection molds are understood to also apply to powdered metal injection molding and other materials from which shaped parts are made by injection molding, even if they are not mentioned or described specifically.

A typical injection mold is made in two separable portions or mold halves that are configured to form a desired interior mold cavity or plurality of cavities when the two mold halves are mated or positioned together. Then, after liquid or molten plastic is injected into the mold to fill the interior mold cavity or cavities and allowed to cool or cure to harden into a hard plastic part or several parts, depending on the numbers of cavities, the two mold halves are separated to expose the hard plastic part or parts so that the part or parts can be removed from the interior mold cavity or cavities.

In many automated injection molding systems, ejector apparatus are provided to dislodge and push the hard plastic parts out of the mold cavities. A typical ejector apparatus includes one or more elongated ejector rods extending through a mold half into the cavity or cavities and an actuator connected to the rod or rods for sliding or stroking them longitudinally into the cavity or cavities to push the hard plastic part or parts out of the cavity or cavities. However, other kinds of ejector apparatus, such as robotic arms, scrapers, or other devices may also be used. Such ejectors are usually quite effective for dislodging and pushing hard plastic parts out of mold cavities, but they are not foolproof. It is not unusual for an occasional hard plastic part to stick or hang-up in a mold cavity in spite of an actuated ejector. Various methods have been used in efforts to prevent or at least minimize instances when hard plastic parts stick in mold cavities. For example, non-stick coatings, air knives, special mold designs, and other techniques have been tried and some used with various degrees of effectiveness to keep the hard plastic parts from sticking and to enhance their release from the mold halves. One quite common technique used alone or in conjunction with one or more of the techniques described above is to design and set the ejectors to actuate or stroke multiple times in rapid succession, such as four or five cycles each time a hard plastic part is to be removed, so that if a part sticks or is not removed from a mold cavity the first time it is pushed by an ejector, perhaps it can be dislodged by one or more subsequent hits or pushes from the ejectors. Such multiple ejector cycles are often effective to dislodge and clear the hard molded plastic parts from the molds. Disadvantages of multiple ejector cycling, however, include the additional time required for the multiple ejector cycling each time the mold is opened to eject a hardened plastic part before it is closed for injection of a subsequent part and the additional wear and tear on the ejector equipment and the molds occasioned by such multiple cycling. Over the course of days, weeks, and months of injection molding parts in repetitive, high volume production line operations, such additional time, wear, and tear can be significant production quantity and cost factors.

On the other hand, stuck or incompletely ejected hard plastic parts can also cause substantial damage to molds and lost production time. In most injection mold production lines, the injection molding machines operate automatically, once the desired mold is installed, in continuous repetitive cycles of closing the mold halves together, heating them, injecting liquid or molten plastic into the mold cavities, cooling to cure or harden the plastic in the mold into hard plastic parts, opening or separating the mold halves, ejecting the molded hard plastic parts, and closing the mold halves together again to mold another part or set of parts. Very high injection pressures are required to inject the liquid or molten plastic into the mold cavities to completely fill all portions of the cavities in a timely manner, and such high pressures tend to push the mold halves apart during injection of the plastic. To prevent such separation of the mold halves during plastic injection, most injection molding machines have very powerful mechanical or hydraulic rams to push and hold the mold halves together. If a hard plastic part from the previous cycle is not ejected and completely removed from between the mold halves, the powerful mechanical or hydraulic rams will try to close the mold halves onto the hard plastic part, which can and often does damage one or both of the mold halves. Molds are usually machined very precisely from stainless steel or other hard metal, so they are very expensive to replace, and the down-time required to change them is also costly in labor and lost production. It is also not unusual for some of the plastic in a mold cavity to break apart from the rest of the part being molded in the cavity and remain in the mold cavity when the rest of the molded part is ejected. Such remaining material will prevent proper filling and molding of subsequent parts in the cavity, thus causing the subsequent molded parts to be defective. In automated production lines, substantial numbers of such defective parts can be produced before someone detects them and shuts down the injection molding machine for correction of the problem.

To avoid such mold damage, down-time, and defective molded parts as described above, various technologies have also been developed and used to sense or determine whether the hard molded plastic parts have indeed been dislodged and completely ejected or removed from the molds before the mechanical or hydraulic rams are allowed to close. Such technologies have included light beam sensors, vision systems, air pressure sensors, vacuum sensors, and others. The U.S. Pat. No. 4,841,364 issued to Kosaka et al. is exemplary of a vision system in which video cameras take video images of the open mold halves for computerized comparison to video images of the empty mold halves stored in memory to detect any unremoved plastic parts or residual plastic material in the mold halves. The Bangerter et al. U.S. Pat. No. 4,603,329 shows an optoelectric sensor system for sensing presence or absence of the molded plastic parts, while the Mislan U.S. Pat. No. 3,303,537 uses infrared sensors to detect heat from any plastic that may be retained in the mold. The U.S. Pat. No. 4,236,181 uses a television camera to put video images of mold halves on a cathode ray tube (CRT) or television screen to detect images of any plastic parts in the mold that should not be there after ejection.

All or at least most of such part or plastic material detection systems provide some kind of interlock circuit connected or interfaced with the automatic cycling controls of automated injection molding machines to shut-down or otherwise prohibit the injection molding machines from closing the mold halves together if a plastic part or other material is still detected in one or both of the mold halves after the ejection portion of the molding cycle in order to avoid damage to the mold. Then the injection molding machine remains idle until an operator arrives to check the mold, clear any un-ejected plastic part or residual plastic material in the mold halves, and then disable the interlock to re-start the injection molding machines. Therefore, while such part sensing or detector systems avoid mold damage or defective molded parts by preventing the injection molding machines from closing the mold halves on un-ejected plastic parts or on uncleared plastic materials, down-time and loss of production can still be significant. To minimize such down time, it is a common practice to still use the multiple ejector cycles described above along with such part or plastic material sensor systems in order to avoid activation of the shut-down interlock at least for plastic parts or materials that may be dislodged by more than one hit or push by the ejector system. However, such multiple ejector cycles still have the disadvantages described above of taking more time between each opening and closing of the mold halves, and causes additional wear and tear on the ejector systems and molds each of which can accumulate to substantial lost production time over the course of days weeks, and months.

SUMMARY OF THE INVENTION

Accordingly, it is a general object of this invention to improve efficiencies of automated injection molding systems.

It is a more specific object of the present invention to provide an improved interlock system for use in conjunction with plastic part or material detector systems that minimizes down-time of automated injection molding equipment due to stuck or un-ejected plastic parts or material in the molds while also eliminating unnecessary delay time, wear, and tear due to unneeded ejector cycling.

Another specific object of the present invention is to provide an improved interlock system that matches more closely ejector stroke cycles to the ejection need in each plastic part molding cycle.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims. To achieve the foregoing and other objects and in accordance with the purposes of the present invention, as embodied and broadly described herein, the apparatus of this invention may comprise an image acquisition system with a controller that, after each time the ejector cycles, compares actual images of a plastic injection mold when opened to an ideal image of the mold as it should appear when the plastic part is completely removed. If the controller detects from the comparison that the hard plastic part has not been completely removed from the mold after the ejector of the injection molding system cycles once, the controller is programmed to generate and send an ejection signal to actuate the ejector again and then repeats the actual image acquisition, comparison, and, if necessary, ejection signal again and again until an actual image comparison to the ideal image results in a determination that the hard plastic part has been removed from the mold. At that point, the controller generates and sends a signal to the injection molding machine to close the mold and continue with a sequence of molding another part.

To further achieve the foregoing and other objects and in accordance with the purposes of the present invention, as embodied and broadly described herein, the method of this invention may comprise the steps of, upon opening the mold and after firing the ejector, acquiring an actual visual image of the open mold in electrical form, comparing the actual image with an ideal image of how the mold should appear when the hard plastic part is removed to determine whether the hard plastic part has actually been removed, and if it has not been removed, firing the ejector again and then acquiring another actual image for comparison. This sequence is repeated until the actual image shows the part has been removed, at which time the method proceeds with closing the mold to start a new part molding cycle. On the other hand, if the firings of the ejector and comparisons continue over a threshold number of times with no success at removing the part, the sequence stops and actuates an alarm or otherwise signals an operator.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIG. 2 is a diagrammatic side elevation view, partly in cross-section, of the injection molding machine of FIG. 1 to illustrate the plastic injection step of a molding cycle with ejectors retracted;

FIG. 3 is a diagrammatic side elevation view similar to FIG. 2, but with the mold halves separated to open the mold and the ejectors extended to dislodge and remove the molded hard plastic part from the mold cavity;

DETAILED DESCRIPTION OF THE PREFERRED EMBODIMENTS

Figure 1:
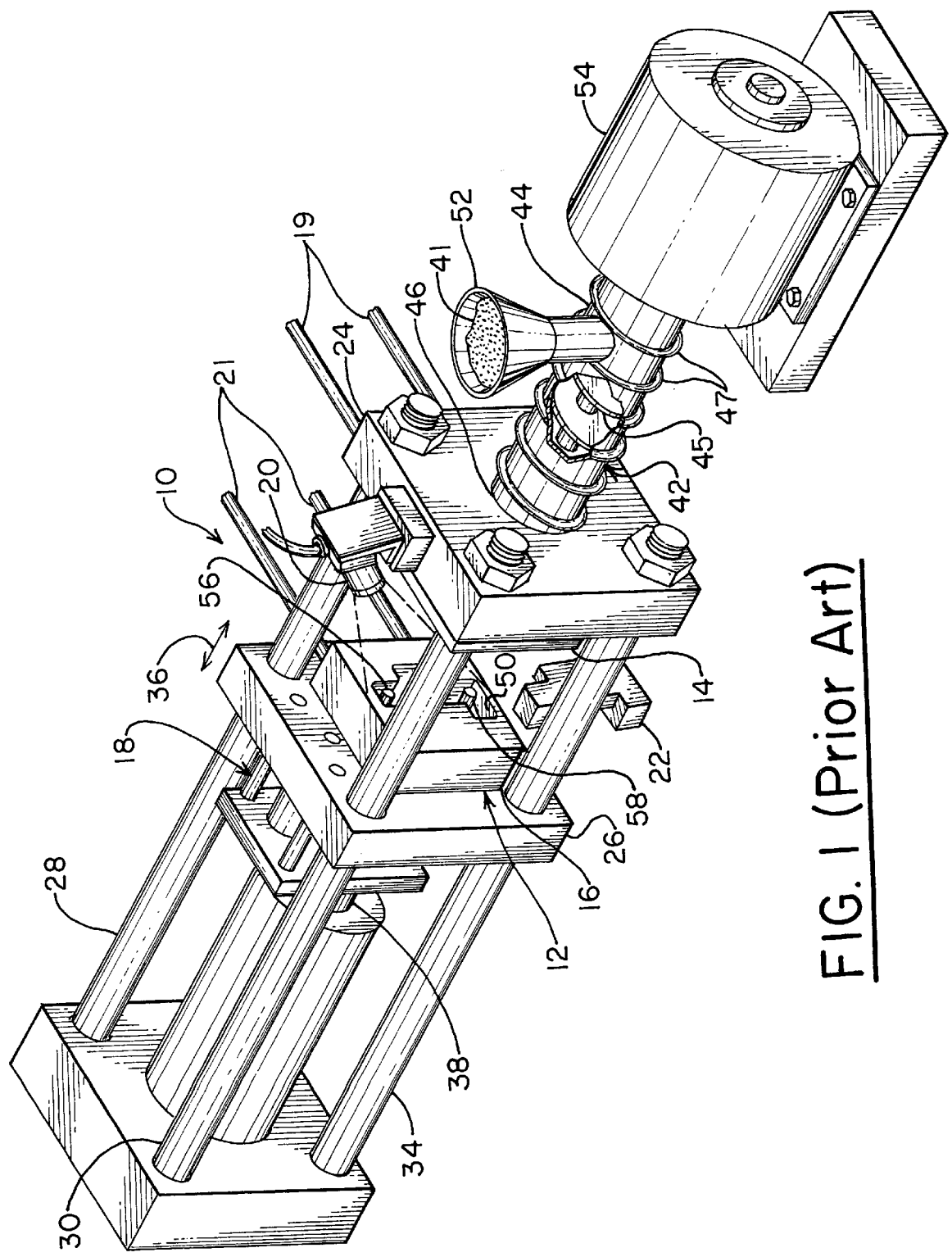
FIG. 1 is a diagrammatic isometric view of a typical injection molding machine equipped with a vision detection system for detecting presence or absence of a plastic part or material in a mold.

To better understand the skip-eject system of this invention, a rudimentary knowledge of a typical injection molding machine and process is helpful. Therefore, referring first to FIGS. 1–3, a typical, conventional automated injection molding machine 10 is shown equipped with a mold 12 comprising two mold halves 14, 16, a sliding rod-type ejector system 18, and a CCD (charge coupled device) array electronic camera 20 for acquiring visual images of the open mold half 14 in electronic pixel format that can be digitized, stored in memory, and processed to detect presence or absence of a plastic part or material in the mold half 14. The present skip ejector invention utilizes the images acquired by the electronic camera 20 and image processing system to control the ejector system 18 in a manner that causes the ejector system 18 to cycle repetitively only when required to dislodge and remove the molded plastic part 22, as will be described in more detail below. It is important to understand, however, that the skip-ejector system of this invention will also work just as well with any of the plastic part or material sensor or detection systems or techniques mentioned above as well as many others. It will also work with any other type or kind of part ejector or removal system, such as robotic arms, scrapers, or any other mechanism that may be used to dislodge or remove molded parts and plastic materials, such as sprues and flash, from many other types of molds, such as cores, multiple plates, and others, therefore, while the skip-ejector system of this invention is described conveniently with the typical, conventional injection molding apparatus described herein, it is not limited to application or implementation with only such conventional apparatus.

In general, the exemplary conventional injection molding machine 10 comprises two platens 24, 26 mounted on a frame made of four elongated, quite substantial frame rods 28, 30, 32, 34 for mounting the two halves 14, 16 of mold 12. The stationary platen 24 is immovably attached to rods 28, 30, 32, 34, while the moveable platen 26 is slidably mounted on the rods 28, 30, 32, 34 so that it can be moved back and forth, as indicated by arrow 36, in relation to the stationary platen 24. Therefore, the mold half 16 mounted on moveable platen 26 is also moveable as indicated by arrow 36 in relation to the other mold half 14 that is mounted on stationary platen 24. A large hydraulic or mechanical ram 38, which is capable of exerting a substantial axial force, is connected to the moveable platen 26 for moving the mold half 16 into contact with mold half 14 and holding them together very tightly while liquid or molten plastic 40 is injected into mold 12, as best seen in FIG. 2. Most molds 12 also include internal ducts 15, 17 for circulating heating and cooling fluid, such as hot and cold water, through the respective mold halves 14, 16. Cooling fluid supply hoses 19, 21 connect the respective ducts 15, 17 to fluid source and pumping systems (not shown). Hot fluid is usually circulated through ducts 15, 17 to keep the mold 12 hot during the injection of liquid or molten plastic 40 into cavity 50. Then cold fluid is circulated through ducts 15, 17 to cool the mold 12 to allow the liquid or molten plastic 40 to solidify into the hard plastic part 22 that is shown in FIG. 3. A typical plastic injector or extrusion system 42 may comprise an injector tube 44 with an auger 45 in the tube 44 for forcing the liquid or molten plastic 40 through an aperture 46 in the stationary platen 24 and through a duct 48 in mold half 14 into a mold cavity 50 that is machined or otherwise formed in mold half 16. In many applications, there are more cavities than one in the mold 12 for molding cycle. In such multiple cavity molds, multiple ejectors may be required to eject the hard molded parts from all of the cavities. The plastic extrusion system 42 also includes a hopper or funnel 52 for filling the tube 44 with the granular solid plastic 41, a heating coil 47 or other heating system disposed around the tube 44 for heating the granular plastic 41 enough to melt it in the tube 44 to liquid or molten plastic 40, and a motor 54 for driving the auger 46.

After the liquid or molten plastic 40 is injected into the mold 12 to fill the mold cavity 50, as illustrated in FIG. 2, and after the plastic 40 in the mold cavity has solidified as described above, the ram 38 is actuated to pull the mold half 16 away from the mold half 14 so that the hard plastic part 22 can be ejected from mold cavity 50. Ejection of the hard plastic part 22, as mentioned above, can be accomplished by a variety of mechanisms or processes that can be made more efficient and effective by this invention, and the ejector system 18 illustrated in FIGS. 1–3 is but one example that is convenient for describing this invention. The ejector system 18 includes two slidable ejector rods 56, 58 that extend through the moveable platen 26 and through mold half 16 into mold cavity 50. When the mold 12 is closed for filling the mold cavity 50 with plastic 40, as shown in FIG. 2, the ejector rods 56, 58 extend to, but not into the mold cavity. However, when the mold 12 is opened, as shown in FIG. 3, an ejector actuator 60, which comprises two small hydraulic cylinders 62, 66 and a cross bar 68 connected to the ejector rods 56, 58, pushes the ejector rods 56, 58 into the mold cavity 50 to hit and dislodge the hard plastic part 22 and push it out of the cavity 50. Because one hit or push by the ejector rods 56, 58 is occasionally not enough to dislodge and push the hard plastic part 22 all the way out of the cavity 50, it is a common practice to cycle the ejector actuator 60 several times to cause the ejector rods 56, 58 to reciprocate into and out of the cavity 50 repetitively so that, if the hard plastic part 22 is still in the cavity, it will get hit and pushed several times, thus reducing instances when the hard plastic part 22 does not get completely ejected to a minimum. Then the electronic camera 20, which is focussed on the mold half 16, acquires an image of the mold halt 16, including the cavity 50, and sends the image in electronic form to an image processing system, where it is digitized and compared by a computer or microprocessor to an ideal image of the mold half 16 and empty mold cavity 50. If the image comparison shows that the mold cavity 50 is empty and that the hard plastic part 22 has been cleared from the mold half 16, the ram 38 is actuated to close the mold 12 to start a new molding cycle. On the other hand, if the image comparison shows that the hard plastic part 22 has not been dislodged from the cavity 50 or cleared from the mold half 16, then the ram 38 is not allowed to close the mold 12, and a signal is generated to notify an operator to check the mold, clear any residual plastic or the hard plastic part 22 from the cavity 50 and mold 12, and then restart the plastic injection molding machine 10.

As discussed above, the repetitive cycling of the ejector rods 56, 58 that is practiced in some conventional injection molding systems reduces occurrences of the hard plastic part 22 not being dislodged from the cavity 50 and removed from the mold half 16. However, for the many instances when one hit or push by the ejector rods 56, 58 would be sufficient to dislodge and remove the hard plastic part 22, which far outnumber the instances when additional hits or pushes by the ejector rods 56, 58 are necessary, the repetitive cycling of the ejector system 18 every time the mold 12 is opened also takes unnecessary time and causes unnecessary wear and tear on the ejector system 18 and mold 12. A significant feature of this invention, therefore, includes different sequences in which the ejector system 18 is actuated only when necessary. Instead of using a large, fixed number of ejector rod 56, 58 strokes or cycles for every time the mold 12 is opened in plastic part molding cycles, a variable number of ejector rod 56. 58 strokes is used to match each molding cycles ejection needs. In one embodiment of the invention, as illustrated in FIG. 4, the ejector system 18 is actuated again after one cycle of ejector rod 56, 58 extension and retraction only when the image recorded by the electronic camera 20 and controller 70 indicates that the hard plastic part 20 has not been dislodged from the cavity 50 or cleared from the mold 12.

Figure 4:
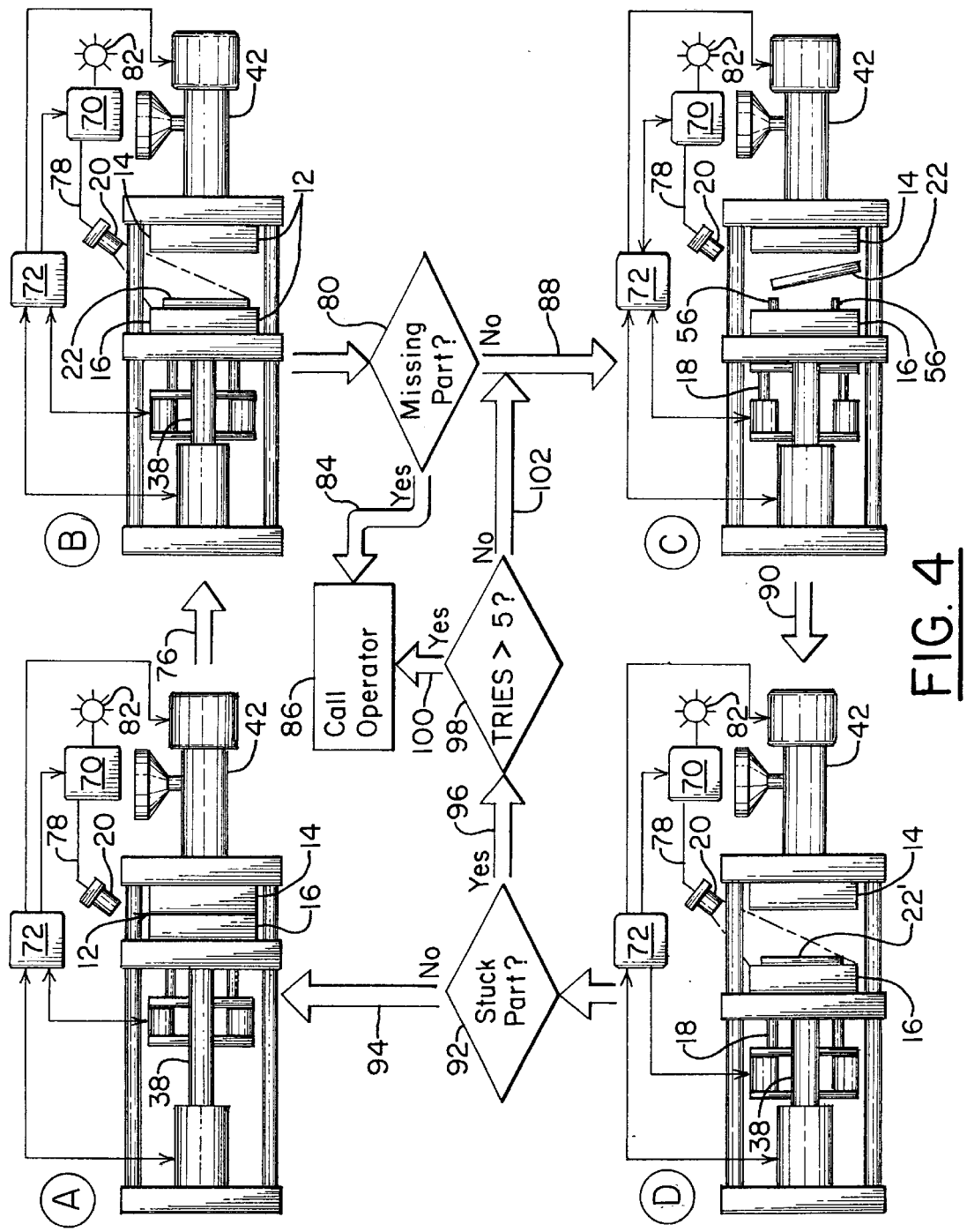
FIG. 4 is a diagrammatic representation of the flow logic of the skip-ejector system of the present invention.

In the first state A illustrated in FIG. 4, the controller 70 sends a mold close signal via an electrical interface 72 to the injection molding machine 10. In response, a close/open mechanism that includes a ram actuator actuates the ram 38 to close and press mold half 16 against the mold half 14 and followed by actuation of the plastic extrude system 42 to inject liquid or molten plastic into the mold 12 to form a plastic part. After allowing sufficient time for the plastic to harden, the process advances as indicated by arrow 76 to state B in which the ram 38 is actuated to pull mold half 16 away from mold half 14. When the mold 12 is open as illustrated in state B, an image of the open mold half 16 is acquired by electronic camera 20 and transmitted via electrical cable 78 to the controller 70, which digitizes and compares the image to an ideal image of the mold half 16 as it should appear with a properly formed plastic part 22 in the cavity. This comparison function of controller 70 is indicated in FIG. 4 by decision block 80. At this point in the sequence, there should be a fully formed hard plastic part 22 in mold half 16. Therefore, if the comparison at decision block 80 indicates that no plastic part 22 is present in mold half 16 or that plastic part 22 is present but incompletely formed, the controller 70 stops the sequence and generates a signal to an alarm 82 or other device as indicated by arrow 84, to signal an operator 86 to come and check the injection molding machine 10. However, if the comparison indicates that a fully formed plastic part 22 is present in the mold 12, as it is supposed to be, the controller 70 causes the sequence to continue, as indicated by arrow 88, to state C by sending a signal via electrical interface 72 to actuate the ejector system 18 to extend the ejector rods 56, 58 to cycle once to hit or push the hard plastic part out of the mold half 16. However, as discussed above, occasionally, one extension of ejector rods 56, 58 will not dislodge or clear the hard plastic part 22 from mold half 16. Therefore, the controller 70 causes the sequence to proceed as indicated by arrow 90 to state D.

In state D, the controller 70 acquires another image of the mold half 16 in electrical form from electronic camera 20 via cable 78 and compares it, as indicated by decision block 92, to an ideal image, which is stored in memory, of the mold half 16 with the hard plastic part 22 removed and the mold cavity 50 (not seen in FIG. 4) empty. If the comparison at decision block 92 indicates that the part 22 is cleared and the cavity 50 is empty, the controller 70 continues the sequence as indicated by arrow 94 back to state A by sending a signal via electrical interface 72 to actuate the ram 38 to again close the mold 12 and to actuate the extruder system 42 to again fill the mold 12 with plastic. On the other hand, if the comparison at decision block 92 indicates the part 22 is stuck in the mold half 16 as indicated by phantom lines 22' or otherwise not cleared, then the controller 70 proceeds as indicated by arrow 96 to check the number of times that the ejector rods 56, 58 have been extended or cycled. If, as indicated at decision block 98, the ejector rods 56, 58 have been cycled more than some reasonable number, such as five (5), in unsuccessful tries to dislodge and clear the part 22 from the mold half 16, the controller 70 stops the sequence, and, as indicated by arrow 100, proceeds to signal the alarm 82 or other device 86 to call the operator. However, if the number of tries has not exceeded the number, such as five (5), the controller 70 returns the sequence to state C, as indicated by arrow 102, by signaling the ejector actuator via interface 72 to again fire or cycle the ejector rods 56, 58 to hit or push the part 22 once again. The controller 70 then continues the sequence again as indicated by arrow 90 to state D where another image of the mold half 16 is acquired with camera 20 and compared again at 92 to the ideal image of how the mold half 16 should appear with the part cleared. If the part 22 was successfully cleared by the last extension or cycle of the ejector pins 56, 58, the sequence proceeds as indicated by arrow 94 to state A. However, if the comparison at 92 indicates the part 22' is still stuck or not cleared, the controller 70 checks the number of tries at 98 and, if not more than the number, e.g., five (5), returns the sequence to state C again. The maximum number of tries set in decision 98 can be any number, but it is preferably set at a number, for example five (5), that is deemed to allow enough cycles or extensions of ejector rods 56, 58 to reasonably be expected to dislodge and clear the part 22 without becoming practically futile. Thus, multiple cycles of extensions and retractions of the ejector rods 56, 58 are available and used when the part 22 gets stuck, but the invention prevents unneeded repetitive cycles of the ejector rods 56, 58 when the part 22 has been dislodged and cleared from the mold.

By checking for a cleared mold half 16 with an empty cavity after every cycle or firing of the ejector system 18 according to this invention, rather than after every several firings, it is expected that the ejector system 18 will rarely have to be actuated or fired more than once in a part molding cycle, thus saving both time and wear. In production lines where an injection molding machine 10 is automatically cycled to continue producing plastic parts for weeks and months on end, the saved time can be significant and can allow each injection molding machine 10 to produce many additional parts in a year. For example, if all the hard plastic parts get ejected by the first ejector stroke in nine out of ten molding cycles, and if the hard plastic parts are always ejected after five ejector strokes, then variable ejector cycling according to this invention could save at least thirty-six strokes when compared to ten fixed stroke cycles. Specifically, fifty strokes (10 cycles×5 strokes/cycle) minus fourteen strokes (9 single strokes plus 1×5 strokes) equals thirty-six skipped ejector strokes.

Figure 5:
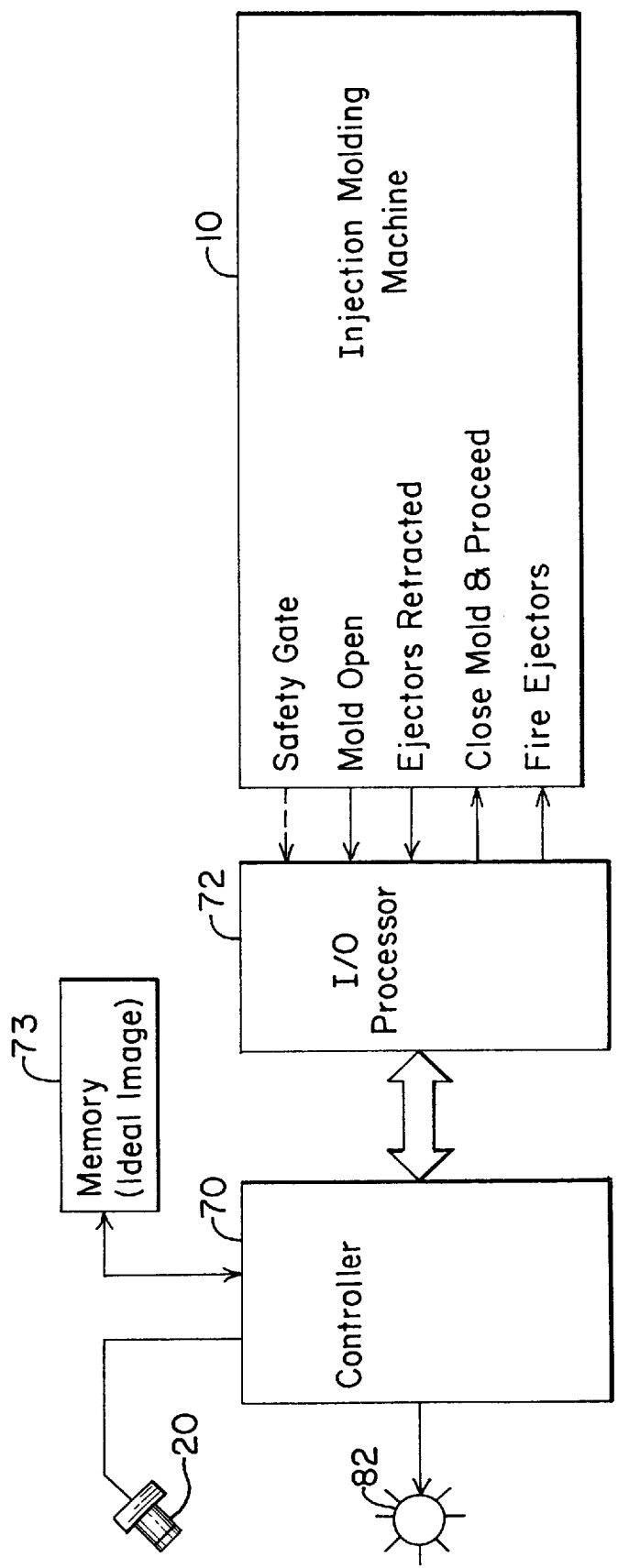
FIG. 5 is a functional block diagram of an electric control circuit for the skip-eject system of the present invention.

The skip eject feature of this invention can be implemented by any of a wide variety of electric circuits that persons skilled in the art could provide. One such circuit is illustrated in functional block diagrammatic form in FIG. 5, and a power-loss interlocking interface for such a circuit is described in a U.S. patent application Ser. No. 08/824,671 by inventor Rikk Crill, entitled Power-Loss Interlocking Interface Method and Apparatus, which is being filed concurrently herewith and which is incorporated herein by reference. As described above, many conventional injection molding machines 10 already have control circuits (not shown) that automatically cycle the injection molding machine 10 through repetitive sequential molding steps, including: (I) actuating the ram 38 to close and hold the mold half 16 onto mold half 14; (ii) actuate the plastic extruder 42 to inject liquid or molten plastic into the cavity 50 of mold half 16; (iii) after the plastic hardens, pulling mold half 16 and the hard plastic part 22 away from mold half 14; (iv) actuate the ejector rods 56, 58 to dislodge the hard plastic part 22 from the mold half 16; and (v) start the cycle over again. Therefore, an interface including an input/output (I/O) processor 72 can be connected to the injection molding machine 10 to provide the input and output signals required to implement this invention on such a conventional injection molding machine 10.

First, such conventional injection molding machine 10 usually has a safety lockout, which is activated by a person who needs to work on the machine 10, to prevent the machine 10 from starting and injuring the worker. Therefore, such safety gate signal is also provided to the I/O processor 72, which sends a signal to controller 70. When such a safety gate signal is present, controller 70 will not output any signal to the injection molding machine 10 that would start the injection molding machine 10 into a cycle that could injure the worker. If there is no such safety gate signal, the controller 70 will continue the operation sequence.

The only other inputs the controller 70 needs from the injection molding machine 10 are: (i) a signal indicating when the mold 12 is open, so the controller 70 can in response start the image acquisitions and comparisons of block 80 in FIG. 4 to determine if a fully molded plastic part 22 has been made: and (ii) a subsequent signal indicating that the ejector rods 56. 58 have been extended and retracted, so the controller can in response start the image acquisitions and comparisons of block 92 to determine if the part 22 has been dislodged and cleared from the mold 12. The only two outputs the injection molding machine 10 needs from the controller 70 are: (i) a signal telling the injection molding machine 10 to close the mold and continue with the plastic injection, hardening, and mold opening sequence after the controller 70 has determined that the mold is clear at block 92; and (ii) a signal telling the injection molding machine 10 to fire the ejectors once after determining at either block 80 or block 92 that a plastic part is in the mold, and, if it is block 92, that the maximum number of ejector tries has not been exceeded at block 98.

An alternative actuation to start the image acquisitions could be a timer circuit (not shown) to start the initial image acquisition, not from an open mold signal as described above, but after a predetermined time delay after closing the mold. The time delay would be set to allow sufficient time for filling the cavity, hardening the part, and opening the mold. The subsequent image acquisitions could also be initiated, not by a signal indicating that the ejector rods 56, 58 have been retracted to their non-use or idle positions, but by a predetermined time delay after the ejector actuator 18 has been fired. Such a time delay based implementation of this invention is useful for injection molding machines that are not set up to output a signal to indicate when the ejector rods 56, 58 have been retracted to their non-use or idle positions. This time delay would be set to allow the ejector rods to cycle once. The time delay could also be enough to allow the ejector rods 56, 58 to cycle more than once before the image of the mold is acquired, as explained for a variation described below.

The ideal image used in the comparison at block 80 can be acquired and placed in memory 73 by acquiring an image of the open mold half 16 when it is known to have a fully formed hard plastic part 22 and then having the controller 70 store that image in memory 73. Likewise, the ideal image used in the comparison at block 92 can be acquired and placed in memory 73 by acquiring an image of the open mold half 16 when it is known to be empty and having the controller 70 store that image in memory 73 also. When comparing the actual images to the respective ideal images, pixel, gray shade values of the actual images can be subtracted from pixel values of the respective ideal images. If the difference is small, then the actual image is nearly the same as the ideal image. Thresholds can be set for differences that are tolerable or not tolerable. Image acquisitions and comparisons can be accomplished in this manner in about 40 milliseconds or less. Other data cross-correlation or similar techniques known to persons skilled in the art can also be used to make the image comparisons that are utilized with this invention.

It is not necessary for purposes of this invention that the ideal image at state D is of the mold half 16 without the part 22 and the ejector rods 56, 58 are retracted. That ideal image is preferred, but the comparison could be with the ejector rods 56, 58 extended, if that is the ideal image stored in memory for the comparison. Also, the invention does not require the separate interface 72, although it is a convenient way to install the skip-eject system of this invention on existing injection molding machines. The interface functions could also be provided by the controller 70. Persons skilled in the art will be able to provide any number of different electrical circuits to practice this invention.

While it is preferred that the open mold half 16 be checked after each ejector stroke to see if the hard plastic part 22, as described above, there are other variations. For example, the variable stroke feature of this invention can be delayed, thus no image checking of the open mold half 16, until a minimum number of strokes are performed. For another example, ejector strokes can be grouped so that the image of the mold half 16 is checked only after each group of some number of strokes, such as after each two strokes or after each three strokes. In another variation, a maximum time or a minimum time can be used to impose upper or lower limits on ejector cycling instead of specific maximum or minimum stroke counts. Any combination of these variations can also be used.

In an alternative implementation of this invention, at the progression to state C as indicated by arrow 88 in FIG. 4, the controller signals the ejector system 18 to start cycling, and the ejector system 18, once started, continues to repetitively extend and retract the ejector rods 56, 58 until the controller 70 sends a stop ejector signal to the ejector system 18. As soon as the controller 70 sends the signal to the ejector system 18 to start cycling, the controller 70 also proceeds as indicated by arrow 90 to start checking the image at state D and comparing it to an ideal image. During the repetitive cycles of the ejector system, the controller 70 also continuously and repetitively acquires actual images of the mold half 16 and compares the images to the ideal image of how the mold half 16 should appear without the part 22. As soon as the controller 70 detects that an actual image of the mold half 16 matches the ideal image, it sends a signal to ejector actuator 18 to stop the cycling of the ejector rods 56, 58. In other words, in this alternate implementation, the controller 70 allows the ejector system 18 to continue its repetitive cycling until the earlier of: (I) an image of the mold half 16 without the part 22 is acquired, or (ii) the maximum number of ejector system cycles at step 98, for example five (5) cycles, is met. At that point, the controller 70 generates and sends a signal via interface 72 to the ejector system to stop the ejector system 18 cycling. If the last comparison 92 shows that the part 22 has cleared, the controller 70 proceeds the sequence to state A as shown by arrow 94. On the other hand, if the last comparison 92 indicates that the part 22 has not cleared, but the maximum number of tries or ejector system cycles has been met at 98, the controller 70 stops the sequence and signals the alarm 82 or otherwise notifies the operator 86. Thus, in this alternative implementation of this invention, the return step 102 is not used, because the ejector system 18 just continues its cycling automatically when it is initiated at state C until it is stopped by the controller 70 as described above. In this manner, the objective of this invention is still achieved by stopping the cycling of ejector system 18 and allowing the sequence to proceed from state D to state A as soon as the part 22 has been dislodged and removed from the mold half 16 The ejector system 18 cycles only as much as necessary to dislodge and clear the part 22 and no more. As in the previous implementation, it is expected that the ejector system 18 will rarely have to cycle to extend and retract ejector rods 56, 58 more than once to dislodge and remove the plastic part 22. To preserve the objectives of the invention in this implementation, it is preferred that the ejector rods 56, 58 not cycle faster than the ability of the controller 70 to acquire, digitize, and compare images so that unnecessary cycles of the ejector rods 56, 58 while the controller is processing an image which may show that the part 22 has cleared the mold are avoided. To ensure that the ejector rods 56, 58 do not cycle again after the part 22 has been successfully dislodged and removed from the mold, the image acquisition and processing frequency should be at least three times the cycle frequency of the ejector rods 56, 58.

The foregoing description is considered as illustrative only of the principles of the invention. Furthermore, since number modifications and changes will readily occur to those skilled in the art, it is not desired to limit the invention to the exact construction and process shown described above. Accordingly, all suitable modifications and equivalents may be resorted to falling within the scope of the invention as defined by the claims which follow.

We claim:

1. A method of controlling an injection molding machine that has a mold with a cavity that is closeable for receiving and holding liquid or molten plastic and that is operable for removing a hard plastic part that is formed in the cavity, and an ejector that dislodges and removes the hard plastic part from the cavity, comprising the steps of:

opening the mold;

actuating the ejector;

acquiring an actual image of the open mold in electrical form;

comparing the actual image with an ideal image of the open mold in which the ideal image has no hard plastic part image in the mold to determine if the hard plastic part has been dislodged and removed from the mold;

actuating the ejector again when a determination is made that the hard plastic part has not been dislodged and removed from the mold and then repeating a sequence of steps of acquiring an actual image of the open mold in electrical form and comparing the actual image with an ideal image in which the ideal image has no hard plastic part image in the mold to determine if the hard plastic part has been dislodged and removed from the mold until a determination is made that the hard plastic part has been dislodged and removed from the mold; and closing the mold to receive and hold another injection of liquid or molten plastic only when a determination is made that the hard plastic part has been dislodged and removed from the mold.

2. The method of claim 1, including the steps of keeping count of how many times the ejector is actuated after the mold is opened, comparing the count to a threshold, and, when the count exceeds the threshold, stopping the sequence and signaling an operator.

3. A method of controlling an injection molding machine that has a mold with a cavity that is closeable for receiving and holding liquid or molten plastic and that is operable for removing a hard plastic part that is formed in the cavity, and an ejector that dislodges and removes the hard plastic part from the cavity, comprising the steps of:

opening the mold;

actuating the ejector to start and continue automatic ejector cycling of repetitive part dislodging and removal motions;

beginning and continuing, during said automatic ejector cycling, repetitive image processing cycling in which each image processing cycle includes acquiring an actual image of the open mold in which the ideal image has no plastic part image in the mold to determine if the hard plastic part has been dislodged and removed from the mold, and, upon determining that the hard plastic part has been removed from the mold, stopping said automatic ejector cycling; and closing the mold to receive and hold another injection of liquid or molten plastic.

4. The method of claim 3, wherein said image processing cycling is at a frequency that allows completion of at least one determination of whether the hard plastic part has been removed for each ejector cycle.

5. The method of claim 3, wherein said image processing cycling is at an image processing cycling frequency, said ejector cycling is at an ejector cycling frequency, and said image processing cycling frequency is at least three times greater than said ejector cycling frequency.

6. An injection molding machine that molds plastic parts comprising:

an openable and closeable mold that has a cavity into which liquid or molten plastic can be injected and hardened to fabricate a hard plastic part;

a mold actuator that closes the mold in response to a close mold signal to receive and hold the liquid or molten plastic in the cavity and that opens the mold in response to an open mold signal;

an ejector that is selectively extendable into the cavity;

an ejector actuator that causes the ejector to extend into the cavity in response to an ejection signal to hit or push the hard plastic part in the cavity to dislodge and remove the hard plastic part from the mold and then causes the ejector to retract from the cavity;

a camera positioned to acquire an actual image of the opened mold and to provide an electrical signal that is representative of the actual image of the opened mold where the hard plastic part is fabricated;

a controller that is receptive of the electrical signal from the camera and connected electrically to the mold actuator and to the ejector actuator, said controller being programmed to generate and send an ejection signal to the ejector actuator and then to compare the actual image acquired by the camera to an ideal image of the opened mold with the hard plastic part removed to detect whether the hard plastic part in the mold has actually been removed from the mold, said controller also being programmed to generate and send a close mold signal to the mold actuator if the hard plastic part has been removed and to generate and send another ejection signal to the ejector actuator if the hard plastic part has not been removed.

7. The injection molding machine of claim 6, wherein said controller is also programmed to keep count of how many times an ejection signal is generated and sent to the ejector actuator after an open mold signal actuates the mold actuator to open the mold and to generate an alarm signal to summon an operator if said count exceeds a threshold.

8. In an injection molding machine that has a mold with a cavity that is closeable to receive and hold liquid or molten plastic and operable for removing a hard plastic part that is formed in the cavity, a close/open mechanism attached to the mold with a capability of being actuated in response to a close mold signal to close the mold to receive and hold the liquid or molten plastic and to open the mold after the liquid or molten plastic has hardened into a hard plastic part; an ejector that has a capability of being actuated to move from a non-use position into a motion that is designed to dislodge and remove the hard plastic part from the cavity and back to the non-use position again in response to a fire ejector signal, and a mold checking system that has a capability of determining when the hard plastic part is no longer in the mold, the improvement comprising:

an open mold indicator that produces an open mold signal when the mold is opened;

an ejector cycle indicator that produces an ejector retraction signal when the ejector moves back to the non-use position; and a controller that is responsive to the open mold signal to generate the fire ejector signal and that is responsive to said ejector retraction signal to actuate said mold checking system to determine whether the hard plastic part is no longer in the mold and, if the mold checking system determines that the hard plastic part is no longer in the mold, to generate the close mold signal, otherwise to generate another fire ejector signal, and to continue a sequence of responding to ejector retraction signals to actuate the mold checking system and generate fire ejector signals until the mold checking system determines that the hard plastic part is no longer in the mold and the close mold signal is generated.

9. The improvement of claim 8, wherein said controller is also programmed to keep count of how many times the fire ejector signal is generated after a mold open signal, to compare the count to a maximum number, and to interrupt and stop said sequence when the count exceeds the maximum number.

10. The improvement of claim 9, wherein said controller is also programmed to generate an alarm signal to notify an operator when the count exceeds the maximum number.

11. The improvement of claim 8, wherein said mold checking system includes an electronic camera focussed on the mold when the mold is open, a memory having an ideal image stored therein of the mold without a hard plastic part, and the controller having a capability of comparing an actual image of the mold acquired with the electronic camera to the ideal image and determining from such comparison whether the hard plastic part is no longer in the mold.

12. In an injection molding machine that has a mold with a cavity that is closeable to receive and hold liquid or molten plastic and operable for removing a hard plastic part that is formed in the cavity; a close/open mechanism attached to the mold with a capability of being actuated in response to a close mold signal to close the mold to receive and hold the liquid or molten plastic and to open the mold after the liquid or molten plastic has hardened into a hard plastic part; an ejector that has a capability of being actuated to move from a non-use position into a motion that is designed to dislodge and remove the hard plastic part from the cavity and back to the non-use position again in response to a fire ejector signal; and a mold checking system that has a capability of determining when the hard plastic part is no longer in the mold; the improvement comprising:

an open mold indicator that produces an open mold signal when the mold is opened;

an ejector actuator that is connected to the ejector and is responsive to a fire ejector signal to cause the ejector to cycle continuously back and forth between the non-use position and the motion that is designed to dislodge and remove the hard plastic part from the cavity, said ejector actuator also being responsive to the close mold signal to stop the cycle and park the ejector in the non-use position; and a controller that is responsive to the open mold signal to generate the fire ejector signal and to actuate said mold checking system to determine whether the hard plastic part is no longer in the mold and, if the mold checking system determines that the hard plastic part is no longer in the mold, to generate the close mold signal.

13. The improvement of claim 12, wherein the ejector actuator is also responsive to an interrupt signal to stop the cycle and park the ejector, and wherein said controller is also programmed to keep count of how many times the ejector cycles after a mold open signal, to compare the count to a maximum number, and to generate the interrupt signal when the count exceeds the maximum number.

14. The improvement of claim 13, including an alarm that is responsive to said interrupt signal to notify an operator when the count exceeds the maximum number.

15. The improvement of claim 12, wherein said mold checking system includes an electronic camera focussed on the mold when the mold is open, a memory having an ideal image stored therein of the mold without a hard plastic part, and the controller having a capability of comparing an actual image of the mold acquired with the electronic camera to the ideal image and determining from such comparison whether the hard plastic part is no longer in the mold.

16. The improvement of claim 15, wherein the controller has the capability of continuously in repetitive mold check cycles comparing sequential actual images of the mold acquired with the electronic camera to the ideal image and determining from such comparisons whether the hard plastic part is no longer in the mold.

17. The improvement of claim 16, wherein said ejector cycles at an ejector frequency and said mold check system cycles at a mold check frequency such that the mold check frequency is at least three times greater than the ejector frequency.

18. In an injection molding machine that has a mold with a cavity that is closeable to receive and hold liquid or molten plastic and operable for removing a hard plastic part that is formed in the cavity, a close/open mechanism attached to the mold with a capability of being actuated in response to a close mold signal to close the mold to receive and hold the liquid or molten plastic and to open the mold after the liquid or molten plastic has hardened into a hard plastic part; an ejector that has a capability of being actuated to move through an ejector cycle from a non-use position into a motion that is designed to dislodge and remove the hard plastic part from the cavity and back to the non-use position again in response to a fire ejector signal and a mold checking system that has a capability of determining when the hard plastic part is no longer in the mold, the improvement comprising:

an open mold indicator that produces an open mold signal when the mold is opened;

a timer circuit that is responsive to the fire ejector signal to produce a time-delay signal after sufficient time has elapsed for the ejector to move through at least one of said ejector cycles; and a controller that is responsive to the open mold signal to generate the fire ejector signal and that is responsive to said time-delay signal to actuate said mold checking system to determine whether the hard plastic part is no longer in the mold and, if the mold checking system determines that the hard plastic part is no longer in the mold, to generate the close mold signal, otherwise to generate another fire ejector signal, and to continue a sequence of responding to time-delay signals to actuate the mold checking system and generate fire ejector signals until the mold checking system determines that the hard plastic part is no longer in the mold and the close mold signal is generated.

19. The improvement of claim 18, wherein said controller is also programmed to keep count of how many times the time-delay signal is generated after a mold open signal, to compare the count to a maximum number, and to interrupt and stop said sequence when the count exceeds the maximum number.

20. The improvement of claim 19, wherein said controller is also programmed to generate an alarm signal to notify an operator when the Count exceeds the maximum number.

21. The improvement of claim 18, wherein said mold checking system includes an electronic camera focussed on the mold when the mold is open, a memory having an ideal image stored therein of the mold without a hard plastic part, and the controller having a capability of comparing an actual image of the mold acquired with the electronic camera to the ideal image and determining from such comparison whether the hard plastic part is no longer in the mold.

22. The improvement of claim 18, wherein said timer circuit is responsive to the fire ejector signal to produce the time-delay signal after sufficient time has elapsed for the ejector to move through more than one of said ejector cycles.

* * * * *